(12) United States Patent
Hjertberg et al.

(10) Patent No.: US 9,708,479 B2
(45) Date of Patent: Jul. 18, 2017

(54) MULTISTAGE PROCESS FOR PRODUCING POLYETHYLENE COMPOSITIONS

(71) Applicant: BOREALIS AG, Vienna (AT)

(72) Inventors: Thomas Hjertberg, Kungshamn (SE); Ravindra Tupe, Maharashtra (IN); Udo Wahner, Linz (AT); Tanja Piel, Linz (AT); Yi Liu, Engerwitzdorf (AT); Alexandra Romina Albunia, Linz (AT); Floran Prades, Linz (AT); Joseph Thorman, Helsinki (FI); Dusan Jeremic, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/901,948

(22) PCT Filed: Sep. 24, 2014

(86) PCT No.: PCT/EP2014/002587
§ 371 (c)(1),
(2) Date: Dec. 29, 2015

(87) PCT Pub. No.: WO2015/051878
PCT Pub. Date: Apr. 16, 2015

(65) Prior Publication Data
US 2016/0369091 A1  Dec. 22, 2016

(30) Foreign Application Priority Data

Oct. 10, 2013  (EP) .................................... 13004879

(51) Int. Cl.
*C08L 23/08* (2006.01)
*C08F 2/00* (2006.01)

(52) U.S. Cl.
CPC .......... *C08L 23/0815* (2013.01); *C08F 2/001* (2013.01); *C08L 2205/02* (2013.01); *C08L 2205/03* (2013.01)

(58) Field of Classification Search
CPC ............. C08L 23/0815; C08L 2205/02; C08L 2205/03; C08F 2/001; C08F 210/16; C08F 210/14; C08F 2500/07; C08F 2500/12
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,532,311 A | 7/1985 | Fulks et al. |
| 4,543,399 A | 9/1985 | Jenkins, III et al. |
| 4,578,879 A | 4/1986 | Yokoyama et al. |
| 4,582,816 A | 4/1986 | Miro |
| 4,621,952 A | 11/1986 | Aronson |
| 4,803,251 A | 2/1989 | Goode et al. |
| 4,855,370 A | 8/1989 | Chirillo et al. |
| 4,933,149 A | 6/1990 | Rhee et al. |
| 5,026,795 A | 6/1991 | Hogan |
| 5,391,654 A | 2/1995 | Ahvenainen et al. |
| 2012/0214926 A1* | 8/2012 | Berthold et al. ........ C08F 10/00 524/424 |
| 2013/0030125 A1* | 1/2013 | Buryak et al. .......... C08L 23/04 525/240 |
| 2015/0307222 A1* | 10/2015 | Bernreitner et al. .. C08F 210/06 206/524.6 |

FOREIGN PATENT DOCUMENTS

| | | |
|---|---|---|
| EP | 47077 A | 3/1982 |
| EP | 188125 A | 7/1986 |
| EP | 250169 A2 | 12/1987 |
| EP | 372239 A2 | 6/1990 |
| EP | 479186 A2 | 4/1992 |
| EP | 499759 A | 8/1992 |
| EP | 560035 A1 | 9/1993 |
| EP | 579426 A1 | 1/1994 |
| EP | 600414 A1 | 6/1994 |
| EP | 683176 A1 | 11/1995 |
| EP | 684871 A1 | 12/1995 |
| EP | 0688794 A1 | 12/1995 |
| EP | 696293 A1 | 2/1996 |
| EP | 699213 A1 | 3/1996 |
| EP | 707513 A1 | 4/1996 |
| EP | 721798 A | 7/1996 |
| EP | 810235 A2 | 12/1997 |
| EP | 1310295 A | 5/2003 |
| EP | 1228101 B1 | 7/2003 |
| EP | 1415999 A | 5/2004 |
| EP | 1591460 A | 11/2005 |
| EP | 1600276 A1 | 11/2005 |
| EP | 2186833 A1 | 5/2010 |
| GB | 1272778 A | 5/1972 |
| WO | 9425495 A1 | 11/1994 |
| WO | 9618662 A1 | 6/1996 |

(Continued)

OTHER PUBLICATIONS

Geldart and Bayens: The Design of Distributors for Gas-fluidized Beds, Powder Technology, vol. 42, 1985.
Geldart: Gas Fluidization Technology, J. Wiley & Sons, 1986, p. 17-18, 169-186, 183.
International Search Report and Written Opinion of Application No. PCT/EP2014/002587 dated Oct. 27, 2015.

*Primary Examiner* — Nathan M Nutter
(74) *Attorney, Agent, or Firm* — Roberts Mlotkowski Safran Cole & Calderon, P.C.

(57) ABSTRACT

A process for polymerizing ethylene in the presence of a polymerization catalyst by copolymerizing ethylene with a comonomer selected from the group of C4-C10 alpha-olefins in three polymerization stages. The polymers produced in the three stages have different melt flow rates. The polymer composition produced by the process has good mechanical properties and can be used for making pipes. The process has a good productivity and provides a stable and economic operation.

15 Claims, No Drawings

(56) References Cited

FOREIGN PATENT DOCUMENTS

| | | | |
|---|---|---|---|
| WO | 9619503 | A1 | 6/1996 |
| WO | 9632420 | A1 | 10/1996 |
| WO | 9951646 | A1 | 10/1999 |
| WO | 0026258 | A | 5/2000 |
| WO | 0029452 | A1 | 5/2000 |
| WO | 0105845 | A | 1/2001 |
| WO | 0155230 | A1 | 8/2001 |
| WO | 02088194 | A1 | 11/2002 |
| WO | 03106510 | A1 | 12/2003 |
| WO | 2005087361 | A1 | 9/2005 |
| WO | 2005118655 | A1 | 12/2005 |
| WO | 2007025640 | A1 | 3/2007 |
| WO | 2013/144324 | A1 | 10/2013 |

\* cited by examiner

MULTISTAGE PROCESS FOR PRODUCING POLYETHYLENE COMPOSITIONS

FIELD OF THE INVENTION

The present invention is directed to a method of producing ethylene polymers. Especially, the present invention is directed to a method of making multimodal ethylene polymers where the method comprises polymerizing ethylene in three polymerization stages.

Problem to be Solved

It is known in the art to polymerize ethylene in three stages from WO-A-1996018662 where ethylene is first (co)polymerized in a prepolymerization step in a loop reactor and subsequently polymerized in loop and gas phase reactors. In the first step a polymer having an $MFR_2$ between 0.01 and 50 g/10 min and a density between 925 and 975 kg/m$^3$ was produced. The amount of the polymer produced in the first stage was from 1 to 20%, preferably from 5 to 15% of the total production in all three reactors.

EP-B-1228101 discloses a process where ethylene is first homopolymerized to produce a low molecular weight component, then copolymerized to produce a high molecular weight component and then homo- or copolymerized to produce an ultra-high molecular weight component. The relative amounts of the low molecular weight component, high molecular weight component and the ultra-high molecular weight component were from 30 to 60%, from 30 to 65% and from 1 to 30%, respectively.

In spite of the methods disclosed in the prior art, there still exists a need for a process being able to produce multimodal HDPE compositions having a broad molecular weight distribution which process is stable and reliable to operate and where the polymer powder has good handling properties.

The objective of the present invention is thus to overcome the problems of prior art processes and to provide a process which allows the production of ethylene polymer compositions having a broad molecular weight distribution with a high production rate, high productivity of the catalyst and a good production economy. The resulting polymer compositions have a combination of excellent processability, good mechanical properties and good homogeneity.

SUMMARY OF THE INVENTION

The present invention provides a process for producing multimodal ethylene polymers in the presence of a polymerization catalyst comprising the steps of:
  polymerizing ethylene in a first polymerization stage at a temperature of from 30 to 70° C., preferably from 40 to 60° C. and a pressure of from 1 to 150 bar, preferably from 10 to 100 bar, in the presence of the polymerization catalyst to produce a first homo- or copolymer of ethylene;
  polymerizing ethylene in a second polymerization stage at a temperature of from 50 to 115° C., preferably from 90 to 105° C., and a pressure of from 1 to 150 bar, preferably from 50 to 100 bar in the presence of hydrogen and the first homo- or copolymer of ethylene to produce a first ethylene polymer mixture comprising the first homo- or copolymer of ethylene and a second homopolymer of ethylene;
  copolymerizing ethylene in a third polymerization stage at a temperature of from 50 to 100° C., preferably from 65 to 90° C., and a pressure of from 10 to 40 bar, preferably from 15 to 30 bar, in the presence of an alpha-olefin comonomer having from 4 to 10 carbon atoms and the first ethylene polymer mixture to produce a second ethylene polymer mixture comprising the first ethylene polymer mixture and a third copolymer of ethylene; wherein the first ethylene homopolymer has a melt flow rate $MFR_{21}$ of not more than 1.0 g/10 min; the first ethylene polymer mixture has a melt flow rate $MFR_2$ of from 10 to 250 g/10 min; and the second ethylene polymer mixture has a melt flow rate $MFR_{21}$ of from 1 to 50 g/10 min and a density of from 935 to 960 kg/m$^3$.

DETAILED DESCRIPTION

Even though the present invention relates to a three-stage process for producing ethylene polymer compositions, it should be understood that the process may contain additional polymerization stages to the three stages disclosed above. It may contain additional polymerization stages, such as a prepolymerization stage, as long as the polymer produced in such additional stages does not substantially influence the properties of the polymer. Furthermore, any one of the three polymerization stages disclosed above may be conducted as two or more sub-stages, provided that the polymer produced in each such sub-stage as well as their mixture matches the description for the polymer for the respective stage.

However, it is preferred to conduct each of the first, second and third polymerization stage as a single polymerization stage in order to prevent the process from becoming unnecessarily complex. Therefore, in the most preferred embodiment the process consists of three polymerization stages which may be preceded a prepolymerization stage.

The present invention is directed to producing polymers of ethylene comprising three ethylene polymer components where each of the components is produced in a dedicated polymerization stage. One of the components is an ethylene homopolymer and two are copolymers of ethylene with at least one comonomer selected from the group consisting alpha-olefins having from 4 to 10 carbon atoms. Preferably the comonomer is selected from the group of alpha-olefins having from 4 to 8 carbon atoms and their mixtures. Especially preferably the comonomer is 1-butene or 1-hexene or their mixture.

Catalyst

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium catalysts. Especially Ziegler-Natta catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size (D50) of the silica support can be typically from 10 to 100 μm. However, it has turned out that special advantages can be obtained if the support has an average particle size (D50) from 5 to 20 μm, preferably from 5 to 15 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Prepolymerization

The polymerization steps may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 100° C., preferably from 20 to 95° C. and more preferably from 40 to 70° C.

The pressure is not critical and is typically from 1 to 150 bar, preferably from 10 to 100 bar.

The amount of monomer is typically such that from about 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

First Polymerization Stage

In the first polymerization stage a first homo- or copolymer of ethylene is produced. This is done by introducing a polymerization catalyst, optionally through the prepolymerization stage as disclosed above, into the first polymerization stage together with ethylene monomer.

The first homo- or copolymer of ethylene preferably has a melt flow rate $MFR_{21}$ of from 0.01 to 1.0 g/10 min, more preferably from 0.1 to 1.0 g/10 min, and most preferably from 0.1 to 0.7 g/10 min. Typically, an $MFR_{21}/MFR_2$ value within the range of 40 to 100, such as 70, can be used for a typical polymer produced in the first polymerization stage In an alternative preferred embodiment of the invention the first homo- or copolymer of ethylene has such a high molecular weight that the melt flow rate is immeasurably low. In such a case practically no polymer comes out of the melt indexer during the time of the measurement under 21.6 kg load. Then the melt flow rate $MFR_{21}$ is taken as 0 g/10 min.

The first polymerization stage is preferably conducted as a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 0.2 to about 50% by mole, preferably from about 0.5 to about 20% by mole and in particular from about 0.5 to about 15% by mole. When the polymerization is conducted as a continuous process in a loop reactor a range of from 0.5 to 10, preferably from 0.5 to 6% by mole has given good results. The benefit of having a high ethylene concentration is that the productivity of the catalyst is increased but the drawback is that more ethylene then needs to be recycled than if the concentration was lower.

The temperature in the first polymerization stage is typically from 30 to 70° C., preferably from 40 to 70° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerization stage continuously.

Hydrogen is typically not introduced into the first polymerization stage. However, in some cases there may be a need to feed a small stream of hydrogen into the first polymerization stage to control the molecular weight of the polymer as known in the art. If hydrogen is used then the molar ratio of hydrogen to ethylene should not exceed 10 mol/kmol (or mol/1000 mol) and preferably not 5 mol/kmol.

It is possible to feed a small amount of comonomer into the first polymerization stage. The comonomer, if used, is an alpha-olefin having from 4 to 10 carbon atoms. The molar ratio of the comonomer to ethylene is not higher than 100 mol/kmol, preferably not higher than 50 mol/kmol and even more preferably not higher than 30 mol/kmol. In the most preferred embodiment of the invention no comonomer is introduced into the first polymerization stage and the first homo- or copolymer of ethylene is a first homopolymer of ethylene.

Second Polymerization Stage

In the second polymerization stage, a first polymer mixture comprising the first homo- or copolymer of ethylene and a second homopolymer of ethylene is formed. This is done by introducing the particles of the first homo- or copolymer, containing active catalyst dispersed therein, together with additional ethylene into the second polymerization stage. Hydrogen is introduced for controlling the molecular weight. This causes the second homopolymer to form on the particles containing the first homo- or copolymer.

The melt flow rate $MFR_2$ of the first polymer mixture is from 10 to 250 g/10 min, preferably from 5 to 150 g/10 min, and most preferably from 10 to 100 g/10 min. The $MFR_2$ of the first polymer mixture is higher than the $MFR_2$ of the first homo- or copolymer.

As it is well understood by the person skilled in the art, the melt flow rate of the second homopolymer of ethylene cannot be measured because the second homopolymer never exists in isolation. It is also questionable if a mixing rule to calculate the melt flow rate can be used, because a mixing rule fitted within the specific split and MFR ranges does not exist. However, when producing the second homopolymer in the second polymerization stage it is beneficial to adjust the hydrogen to ethylene ratio within the fluid phase to such values which would produce a homopolymer having a melt flow rate of about from 100 to 2000 g/10 min, preferably about from 300 to 1000 g/10 min in a single-stage polymerization with the actual catalyst.

The density of the first polymer mixture is typically higher than 965 kg/m$^3$ and preferably from 968 to 978 kg/m$^3$, more preferably from 970 to 978 kg/m$^3$. As it is understood by the person skilled in the art the density of the first polymer mixture cannot be controlled in the case both the first homopolymer and the second homopolymer are ethylene homopolymers. Thereby the density of the first polymer mixture is set by the melt indices of the first and second homopolymers and the relative proportions of said homopolymers.

Furthermore, the density of the second homopolymer cannot be measured because the second homopolymer cannot be isolated from the first polymer mixture. However, the density of the second homopolymer can be estimated from the densities of the first polymer mixture and the first homo- or copolymer by using the equation:

$$\rho_b = w_1 \cdot \rho_1 + w_2 \cdot \rho_2 \qquad (\text{eq. 1})$$

Where $\rho$ is the density in kg/m$^3$, w is the weight fraction of the component in the mixture and subscripts b, 1 and 2 refer to the overall mixture (=first polymer mixture), component 1 (=first homo- or copolymer) and component 2 (=second homopolymer), respectively.

The polymerization in the second polymerization stage is advantageously conducted as a slurry polymerization at a temperature of from 50 to 115° C., preferably from 90 to 105° C. The pressure is from 1 to 150 bar, preferably from 50 to 100 bar. Furthermore, it is preferred to conduct the polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

Hydrogen feed is adjusted to achieve a desired melt flow rate (or molecular weight) of the first polymer mixture. Suitably, the hydrogen feed is controlled to maintain constant hydrogen to ethylene molar ratio in the reaction mixture. The actual ratio depends on the catalyst as well as the type of the polymerization. Good results have been obtained in slurry polymerization above the critical temperature and pressure of the fluid mixture by maintaining the ratio within the range of from 200 to 1000 mol/kmol, preferably from 300 to 800 mol/kmol.

Preferably, the second polymerization stage is conducted in a loop reactor in a similar manner as was described for the first polymerization stage except for what has been otherwise mentioned above.

The first polymer mixture comprises from 2 to 20% by weight of the first homo- or copolymer and from 80 to 98% by weight of the second homopolymer. Preferably, the first polymer mixture comprises from 3 to 30% by weight of the first homo- or copolymer and from 70 to 97% by weight of the second homopolymer. And most preferably, the first polymer mixture comprises from 4 to 18% by weight of the first homo- or copolymer and from 82 to 96% by weight of the second homopolymer.

Third Polymerization Stage

In the third polymerization stage, a second polymer mixture comprising the first polymer mixture and a third copolymer of ethylene is formed. This is done by introducing the particles of the first polymer mixture, containing active catalyst dispersed therein, together with additional ethylene and comonomer into the third polymerization stage. Hydrogen may be introduced for controlling the molecular weight. This causes the third copolymer to form on the particles containing the first polymer mixture.

The melt flow rate $MFR_{21}$ of the second copolymer mixture is from 1 to 50 g/10 min, preferably from 2 to 50 g/10 min, and most preferably from 3 to 30 g/10 min. The melt flow rate of the second copolymer mixture is lower than the melt index of the first polymer mixture.

As explained above for the first polymer mixture, the $MFR_{21}$ of the third copolymer of ethylene cannot be measured because the third copolymer cannot be isolated from the second polymer mixture. However, the $MFR_{21}$ of the third copolymer of ethylene can be calculated by using the so called Hagström equation (Hagström, The Polymer Processing Society, Europe/Africa Region Meeting, Gothenburg, Sweden, Aug. 19-21, 1997).

$$MI_b = \left( w \cdot MI_1^{\frac{w-b}{a}} + (1-w) \cdot MI_2^{\frac{w-b}{a}} \right)^{-a w^b} \quad \text{(eq. 2)}$$

As proposed by Hagström, a=10.4 and b=0.5 for $MFR_{21}$. Further, unless other experimental information is available, $MFR_{21}/MFR_2$ for one polymer component can be taken as 30. Furthermore, w is the weight fraction of the polymer component having higher MFR. The first polymer mixture can thus be taken as the component 1 and the third copolymer as the component 2. The $MFR_{21}$ of the third copolymer ($MI_2$) can then be solved from equation 1 when the $MFR_{21}$ of the first polymer mixture ($MI_1$) and the second polymer mixture ($MI_b$) are known.

The density of the third copolymer cannot be directly measured. However, by using the standard mixing rule of equation 1 above it can be calculated from the densities of the second polymer mixture and the first polymer mixture. Then the subscripts b, 1 and 2 refer to the overall mixture (=second polymer mixture), component 1 (=first polymer mixture) and component 2 (=third copolymer), respectively.

Hydrogen feed is adjusted to achieve a desired melt flow rate (or molecular weight) of the second polymer mixture. Suitably the hydrogen feed is controlled to maintain constant hydrogen to ethylene ratio in the reaction mixture. The actual ratio depends on the catalyst as well as the type of the polymerization. Good results have been obtained in gas phase polymerization by maintaining the ratio within the range of from 2 to 100 mol/kmol, preferably from 5 to 50 mol/kmol.

The comonomer is selected from ethylene and alpha-olefins containing 4 to 10 carbon atoms and their mixtures. The content of the comonomer is controlled to obtain the desired density of the second polymer mixture. Typically the second polymer mixture has a density of from 935 to 960 kg/m$^3$, preferably from 940 to 955 kg/m$^3$ and more preferably from 945 to 955 kg/m$^3$.

The comonomer is typically introduced to maintain a constant comonomer to ethylene ratio in the reaction mixture. The comonomer to ethylene ratio that is needed to produce a polymer with the desired density depends, among others, on the type of comonomer and the type of catalyst. With 1-hexene as a comonomer good results have been obtained in gas phase polymerization with a molar ratio of 1-hexene to ethylene of from 0.1 to 200 mol/kmol, preferably from 0.1 to 20 mol/kmol.

Preferably the third polymerization stage is conducted as a fluidized bed gas phase polymerization. In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher than minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values.

Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

The second ethylene polymer mixture comprises from 40 to 60% by weight, preferably from 45 to 55% by weight of the first ethylene polymer mixture, and from 40 to 60% by weight, preferably 45 to 55% by weight of the third copolymer of ethylene.

The second polymer mixture preferably comprises from 45 to 60% by weight, more preferably from 48 to 55% by weight of the first polymer mixture, and from 40 to 55% by weight, more preferably from 45 to 52% by weight of the third copolymer of ethylene.

Extrusion

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Benefits of the Invention

The process of the invention is capable of producing multimodal ethylene polymers having a combination of excellent processability and good mechanical properties. Furthermore, the process of the invention allows stable and smooth production of the multimodal resin.

In more specific, the resulting polymers are useful for producing pipes having improved processability and improved pressure resistance. The resins furthermore have a reduced number and size of white spots compared to similar prior art resins.

The polymer powder formed in the process of the present invention has good handling properties. This allows a stable operation of the process.

Description of Methods

Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg.

The melt index MFR is herein assumed to follow the following mixing rule (equation 2):

$$MI_b = \left( w \cdot MI_1^{\frac{w-b}{a}} + (1-w) \cdot MI_2^{\frac{w-b}{a}} \right)^{-a \cdot w^b} \quad (eq. 2)$$

Where a=10.4 and b=0.5, w is the weight fraction of the component having the higher MFR in the mixture, MI is the melt index $MFR_{21}$ and subscripts b, 1 and 2 refer to the mixture, component 1 and component 2, respectively.

Density

Density of the polymer was measured according to ISO 1183-1:2004 Method A on compression moulded specimen prepared according to EN ISO 1872-2 (February 2007) and is given in kg/m³.

The density is herein assumed to follow the mixing rule (equation 1):

$$\rho_b = w_1 \cdot \rho_1 + w_2 \cdot \rho_2 \quad (eq. 1)$$

Where ρ is the density in kg/m³, w is the weight fraction of the component in the mixture and subscripts b, 1 and 2 refer to the overall mixture, component 1 and component 2, respectively.

Flowability of the Polymer

The flowability of powder samples was measured by using a steel funnel according to ASTM B417. The amount of the powder used in the test was 50 grams. The powder was then allowed freely to discharge from the funnel. The time when all the powder had discharged was recorded and reported as flowability.

Activity of the Catalyst

The activity of the catalyst (in kg/(g·h)) was determined as the amount of polymer produced in the process (in kg/h) divided by the amount of catalyst fed into the process (in g/h) per unit of the residence time in the reactor (h).

Particle Size of the Catalyst

Particle size is measured by Coulter Counter LS 200 at room temperature with n-heptane as medium.

EXAMPLES

Catalyst Preparation

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

330 kg silica (calcined silica, Sylopol® 2100, having median particle size $d_{50}$ of about 9 μm) and pentane (0.12 kg/kg carrier) were charged into a catalyst preparation reactor. Then EADC (Ethylaluminium dichloride) (2.66 mol/kg silica) was added into the reactor at a temperature below 40° C. during two hours and mixing was continued for one hour. The temperature during mixing was 40-50° C. Then Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst is:
Al/Mg/Ti=1.5/1.4/0.8 (mol/kg silica).

Example 1

Polymers were synthesized by using a bench scale 5 L reactor and following a three step process.

Into a stirred 5 liter reactor maintained at a temperature of 23° C. were introduced 650 g propane diluent and triethylaluminium (TEA) as a cocatalyst was introduced so that the ratio of TEA/Ti was 15. The temperature was then raised to 40° C. and 37.5 mg of the solid catalyst component prepared as discussed above were added with 200 g of propane diluent, together with 20 g ethylene. The temperature was then raised to 50° C. after which ethylene was continuously introduced so much that the pressure in the reactor was 22 barg. The polymerization was continued until 35 g polymer were produced, after which the temperature in the reactor was increased to 85° C. and 53 L hydrogen was added to the reactor. Ethylene was then fed into the reactor so that the pressure in the reactor was 58.5 barg. The polymerization was continued until 232.5 g polymer were produced. The polymerization was then interrupted by venting the hydrocarbons from the reactor.

Then, the temperature of the reactor was adjusted to 80° C. and into the reactor were introduced 190 g propane diluent, 1.8 g 1-hexene as a comonomer and then a continuous $C_6/C_2$ feeding of 4 wt %, 3 mL hydrogen and ethylene so that the pressure in the reactor was 20 barg. The polymerization was conducted until 232.5 g polymer were produced after which the hydrocarbons were removed from the reactor and the powder was recovered and dried.

The polymer was then extruded to pellets after addition of 2.5% carbon black by using a twin-screw co-rotating extruder ZSK-18. The data is shown in Table 1.

Examples 2 and 3

The procedure of Example 1 was repeated but the duration of the first polymerization stage was adjusted so that down to 12.5 g polymer was produced. The data is shown in Table 1.

Comparative Example 1

The procedure of Example 1 was repeated except that the first polymerization stage was not present and temperature was increased to 95° C. right after the catalyst components were introduced directly into the second polymerization stage. The data is shown in Table 1.

TABLE 1

| Example | 1 | 2 | 3 | CE1 |
|---|---|---|---|---|
| Activity of the catalyst [Kg PE/g cat/h] | 5.3 | 5.4 | 6.0 | 5.9 |
| $MFR_5$ [g/10 min] | 0.08 | 0.09 | 0.11 | 0.15 |
| $MFR_{21}$ [g/10 min] | 4.6 | 5.34 | 5.0 | 7.1 |
| $MFR_5$ [g/10 min] compounded | 0.08 | 0.1 | 0.14 | 0.2 |
| $MFR_{21}$ [g/10 min] compounded | 4.6 | 6.0 | 6.3 | 9.5 |
| FRR compounded | 58 | 60 | 45 | 47 |
| 1-hexene content, [wt-%] | 0.8 | 0.9 | 0.8 | 1.0 |
| Density [kg/m$^3$] | 951 | 952 | 951 | 952 |
| Split $1^{st}/2^{nd}/3^{rd}$ | 7/46/47 | 5/47/48 | 2.5/48.5/49 | 0/51/49 |

Examples 4 and 5

The procedure of Example 1 was repeated except that the solid catalyst component was changed to a commercially available catalyst Lynx 200 from BASF, and the pressure in the reactor in the first polymerisation step was 20.3 barg, and the temperature of the reactor in the second polymerisation step was adjusted to 95° C., and the temperature of the reactor in the third polymerisation step was 85° C. and the continuous $C_6/C_2$ feeding was of 7.5 wt %. The polymer was then extruded to pellets after addition of 2.5% carbon black by using a twin-screw co-rotating extruder ZSK-18. The data is shown in Table 2.

Comparative Example 2

The procedure of Comparative Example 1 was repeated except that the solid catalyst component was changed to a commercially available catalyst Lynx 200 from BASF and the temperature of the reactor in the second polymerisation step was adjusted to 95° C., and the temperature of the reactor in the third polymerisation step was 85° C. and the continuous $C_6/C_2$ feeding was of 7.5 wt % and 250 mL hydrogen were feed so that the pressure in the reactor was 20.6 barg. The polymer was then extruded to pellets after addition of 2.5% carbon black by using a twin-screw co-rotating extruder ZSK-18. The data is shown in Table 2.

TABLE 2

| Example | 4 | 5 | CE2 |
|---|---|---|---|
| Activity of the catalyst [Kg PE/g cat/h] | 15 | 15 | 19 |
| $MFR_5$ [g/10 min] | 0.09 | 0.13 | 0.31 |
| $MFR_{21}$ [g/10 min] | 5.0 | 7.7 | 13 |
| $MFR_5$ [g/10 min] compounded | 0.07 | 0.07 | 0.31 |
| $MFR_{21}$ [g/10 min] compounded | 3.9 | 4.2 | 13 |
| FRR compounded | 55 | 59 | 41 |
| 1-hexene content, [wt-%] | 2.6 | 2.6 | 3.6 |
| Density (base resin) [kg/m$^3$] | 948 | 947 | 948 |
| Density (compound) [kg/m$^3$] | 959 | 959 | 961 |
| Split $1^{st}/2^{nd}/3^{rd}$ | 9/46/45 | 4/49/47 | 0/51/49 |

From the polymers of Examples 1 to 3 and Comparative Example 1, mechanical properties were evaluated. They are shown in Table 3.

TABLE 3

| Example | 4 | 5 | CE2 |
|---|---|---|---|
| Tensile Modulus [MPa] | 1180 | 1180 | 1180 |
| Tensile stress at yield [MPa] | 27 | 27 | 26 |
| Tensile stress at break [MPa] | 31 | 31 | 28 |
| Natural Draw Ratio [%] | 230 | 250 | 260 |

Examples 6 to 8

The procedure of Example 1 was repeated except that the first polymerization step was conducted at temperatures 60° C., 40° C. and 40° C., respectively. The pressure in the reactor in the first polymerisation step was 26.5 barg and 18 barg, at 60° C. and 40° C. respectively. The data is shown in table 4.

Comparative Example 3

The procedure of Comparative Example 1 was repeated except that continuous $C_6/C_2$ feeding in the third polymerization step was of 2.5 wt %. Also the relative amounts of the components were changed by changing the polymerisation time in the first and second step so that different amounts of polymers were produced. The data is shown in Table 4.

The flowability of the polymer powders as described above was measured. The data is also shown in Table 4.

TABLE 4

| Example | 6 | 7 | 8 | CE3 |
|---|---|---|---|---|
| Activity of the catalyst [Kg PE/g cat/h] | 5.6 | 4.4 | 4.2 | 5.8 |
| $MFR_5$ [g/10 min] | 0.08 | 0.06 | 0.08 | 0.16 |
| $MFR_{21}$ [g/10 min] | 3.6 | 2.7 | 5.2 | 8.2 |
| $MFR_5$ [g/10 min] compounded | 0.06 | 0.07 | 0.08 | 0.2 |
| $MFR_{21}$ [g/10 min] compounded | 2.7 | 3.1 | 5.2 | 10 |
| FRR compounded | 45 | 44 | 65 | 51 |
| Split $1^{st}/2^{nd}/3^{rd}$ | 10/45/45 | 9/46/45 | 8/53/39 | 0/55/45 |
| Flowability [s] | 6 | 6 | 5 | No result |

No result indicates that the powder did not flow through the funnel in the flowability test but jammed in the funnel.

Example 9

A loop reactor having a volume of 150 dm$^3$ was operated at a temperature of 50° C. and a pressure of 60 bar. Into the reactor were ethylene, propane diluent and hydrogen so that the ethylene concentration in the fluid mixture was 4.4% by mole, the hydrogen to ethylene ratio was 10 mol/kmol and the propane feed was 40 kg/h. Also 10 g/h of a solid polymerisation catalyst component produced as described above was introduced into the reactor together with triethylaluminium cocatalyst so that the molar ratio of aluminium to titanium was 9 mol/mol. The ethylene homopolymer withdrawn from the reactor had $MFR_{21}$ of 0.4 g/10 min. The production rate was 6 kg/h.

The slurry from the reactor was withdrawn intermittently and directed into a loop reactor having a volume of 350 $dm^3$ and which was operated at 95° C. temperature and 54 bar pressure. Into the reactor was further added 100 kg/h of propane and ethylene and hydrogen so that the ethylene content in the reaction mixture was 2.8 mol-% and the molar ratio of hydrogen to ethylene was 570 mol/kmol. The ethylene homopolymer withdrawn from the reactor had a melt flow rate $MFR_2$ of 35 g/10 min and the production rate was 38 kg/h.

The slurry was withdrawn from the loop reactor intermittently by using settling legs and directed to a flash vessel operated at a temperature of 50° C. and a pressure of 3 bar. From there the polymer was directed to a gas phase reactor operated at a pressure of 20 bar and a temperature of 85° C. Additional ethylene, 1-hexene comonomer, nitrogen as inert gas and hydrogen were added so that the ethylene content in the reaction mixture was 12 mol-%, the ratio of hydrogen to ethylene was 10 mol/kmol and the feed of 1-hexene to the reactor was 2 g/h. The polymer production rate in the gas phase reactor was 40 kg/h and thus the total polymer withdrawal rate from the gas phase reactor was 54 kg/h. The polymer had a melt flow rate $MFR_5$ of 0.12 g/10 min and a density of 949 $kg/m^3$. The production split (% $1^{st}$ stage component/% $2^{nd}$ stage component/% $3^{rd}$ stage component) was 7/45/48.

The polymer was mixed with effective amounts of Ca-stearate, Irganox B225 and HE0880 (Carbon Black masterbatch, corresponding to 2.25% by weight of carbon black). Then it was compounded and extruded under nitrogen atmosphere to pellets by using a CIMP90 extruder so that the SEI was 233 kWh/ton and the melt temperature 273° C. under nitrogen atmosphere.

Example 10

The procedure of Example 9 was followed except that the operation conditions in the loop reactor and the gas phase reactor were modified as shown in Table 5. The powder was not compounded but the material was recovered in powder form.

TABLE 5

| Example | 9 | 10 |
| --- | --- | --- |
| $1^{st}$ loop $C_2$, [mol-%] | 4.4 | 4.3 |
| $1^{st}$ loop $H_2/C_2$, [mol/kmol] | 10 | 18 |
| $1^{st}$ loop $MFR_{21}$, [g/10 min] | 0.4 | N/D[3] |
| $2^{nd}$ loop $C_2$, [mol-%] | 2.8 | 3.3 |
| $2^{nd}$ loop $H_2/C_2$, [mol/kmol] | 570 | 500 |
| $2^{nd}$ loop $MFR_2$, [g/10 min] | 35 | 37 |
| GPR, $C_2$, [mol-%] | 12 | 15 |
| GPR $H_2/C_2$, [mol/kmol] | 10 | 13 |
| GPR $C_6/C_2$, [mol/kmol] | N/D[2] | N/D[2] |
| GPR $MFR_5$, [g/10 min] | 0.12[1] | 0.16[1] |
| GPR density, [kg/m$^3$] | 949[1] | 951[1] |
| Compound $MFR_5$, [g/10 min] | 0.16 | N/D[3] |
| Compound $MFR_{21}$, [g/10 min] | 4.3 | 3.9[1] |
| Compound density, [kg/m$^3$] | 963 | N/D[3] |

Notes:
[1] measured from powder
[2] $C_6$ peak not detected by online GC
[3] Not analyzed

The invention claimed is:

1. A process for producing multimodal ethylene polymers in the presence of a polymerization catalyst comprising the steps of:
   polymerizing ethylene in a first polymerization stage at a temperature of from 30 to 70° C. and a pressure of from 1 to 150 bar in the presence of the polymerization catalyst to produce a first homo- or copolymer of ethylene;
   polymerizing ethylene in a second polymerization stage at a temperature of from 50 to 115° C., and a pressure of from 1 to 150 bar in the presence of hydrogen and the first homo- or copolymer of ethylene to produce a first ethylene polymer mixture comprising the first homo- or copolymer of ethylene and a second homopolymer of ethylene;
   copolymerizing ethylene in a third polymerization stage at a temperature of from 50 to 100° C., and a pressure of from 10 to 40 bar in the presence of an alpha-olefin comonomer having from 4 to 10 carbon atoms and the first ethylene polymer mixture to produce a second ethylene polymer mixture comprising the first ethylene polymer mixture and a third copolymer of ethylene;
   wherein the first homo- or copolymer of ethylene has a melt flow rate $MFR_{21}$ of not more than 1.0 g/10 min; the first ethylene polymer mixture has a melt flow rate $MFR_2$ of from 10 to 250 g/10 min; and the second ethylene polymer mixture has a melt flow rate $MFR_{21}$ of from 1 to 50 g/10 min and a density of from 935 to 960 kg/m$^3$.

2. The process according to claim 1 wherein the second ethylene polymer mixture comprises from 40 to 60% by weight of the first ethylene polymer mixture and from 40 to 60% by weight of the third copolymer of ethylene.

3. The process according to claim 1 wherein the second ethylene polymer mixture comprises from 45 to 60% by weight of the first ethylene polymer mixture and from 40 to 55% by weight of the third copolymer of ethylene.

4. The process according to claim 1 wherein the first ethylene polymer mixture comprises from 2 to 20% by weight of the first homo- or copolymer of ethylene and 80 to 98% by weight of the second copolymer of ethylene.

5. The process according to claim 1, wherein the ethylene content in the fluid phase of the first reactor is 0.2 to 50% by mole.

6. The process according to claim 1, wherein the density of the first polymer mixture is higher than 965 kg/m$^3$.

7. The process according to claim 1, wherein the density of the second polymer mixture 935 to 960 kg/m$^3$.

8. The process according to claim 1, wherein the $MFR_{21}$ of the first homo- or copolymer of ethylene is from 0.01 to 1.0 g/10 min.

9. The process according to claim 1, wherein the $MFR_2$ of the first polymer mixture is from 2 to 200 g/10 min.

10. The process according to claim 1, wherein the $MFR_2$ of the first polymer mixture is higher than the $MFR_2$ of the second polymer mixture.

11. The process according to claim 1, wherein the first and second polymerization stages are conducted as a slurry polymerization.

12. The process according to claim 1, wherein the third polymerization stage is conducted in vapour phase in a fluidized bed.

13. The process according to claim 1, wherein the process comprises the steps of:
- continuously introducing ethylene, diluent and the polymerization catalyst into the first polymerization stage;
- continuously withdrawing a stream comprising the first homo- or copolymer of ethylene from the first polymerization stage and passing it into the second polymerization stage;
- continuously introducing streams of ethylene, hydrogen and diluent into the second polymerization stage;
- continuously withdrawing a stream comprising the first ethylene polymer mixture from the second polymerization stage and passing at least part of the stream to the third polymerization stage;
- continuously introducing streams of ethylene, hydrogen and the alpha-olefin comonomer into the third polymerization stage;
- continuously withdrawing a stream comprising the second ethylene polymer mixture from the third polymerization stage and recovering the second ethylene polymer mixture therefrom.

14. The process according to claim 1, wherein the polymerization catalyst comprises (i) a solid catalyst component comprising a magnesium compound and a halogen containing titanium compound supported on an inorganic oxide support and (ii) an activator.

15. The process according to claim 14, wherein the inorganic oxide support has a median particle size (D50) of from 5 to 15 μm.

* * * * *